Jan. 29, 1924. 1,482,068
L. F. DOUGLASS
METHOD AND APPARATUS FOR PRODUCING MULTIPLE AND MINIATURE IMAGE
EFFECTS IN PHOTOGRAPHY
Filed Aug. 14, 1922
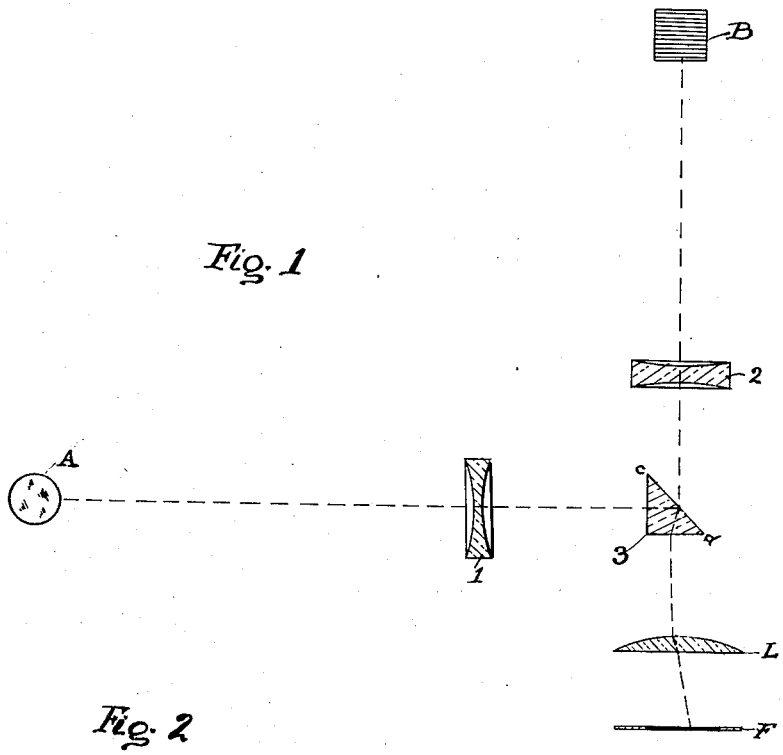
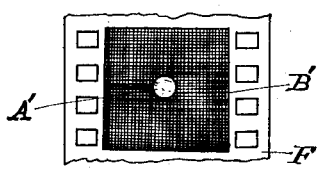
Inventor:
Leon F. Douglass
By: J.E. Trabucco
Attorney Patented Jan. 29, 1924.

1,482,068

UNITED STATES PATENT OFFICE.

LEON F. DOUGLASS, OF MENLO PARK, CALIFORNIA.

METHOD AND APPARATUS FOR PRODUCING MULTIPLE AND MINIATURE IMAGE EFFECTS IN PHOTOGRAPHY.

Application filed August 14, 1922. Serial No. 581,785.

*To all whom it may concern:*

Be it known that I, LEON F. DOUGLASS, a citizen of the United States, and a resident of Menlo Park, in the county of San Mateo and State of California, have invented new and useful Improvements in Methods and Apparatus for Producing Multiple and Miniature Image Effects in Photography, of which the following in a specification.

This invention relates to the method and apparatus whereby multiple and miniature image effects may be produced on a single photographic film by a single exposure, more particularly to the method and apparatus whereby an image of an object may be produced on a single photographic film simultaneously with a miniature image of another object.

An object of my invention is to provide a novel method and improved apparatus whereby a small size or miniature image of an object may be produced upon a single photographic film or plate, simultaneously with a proportionately larger image of another object.

Another object of my invention is to provide apparatus of the type just characterized which may be readily applied to an ordinary camera without change in its mechanism or construction.

Generally stated, I place directly in front of a camera lens, a small 90 degree prism which is so positioned that it both reflects the light rays, proceeding from an object through a concave lens, to a photographic film, and at the same time permits the light rays, passing through another concave lens from another object, to proceed without reflection to said film.

In the accompanying drawings:

Fig. 1, is a diagrammatic view illustrating the relative arrangement of the two objects to be photographed, the two concave lenses, the small light-reflecting prism, the camera lens, the photographic film, and the path of the light rays proceeding from said objects to said film;

Fig. 2, is a diagrammatic fragment of a photographic film upon which two images are produced by means of the apparatus illustrated in Fig. 1.

Referring to Fig. 1, A, one of the objects to be photographed, is positioned at an angle of approximately 90 degrees with reference to the axis of lens L, which may be the lens of any suitable camera, and B, the other object to be photographed, is positioned directly in front of the said lens L. Directly in front of lens L is 3, a small 90 degree prism, so positioned that one of its surfaces reflects the light rays proceeding from object A, through lens L onto film F. Interposed in the path of the light rays proceeding from object A, is 1, a double concave spherical lens of approximately −10 diopters positioned at a distance of about seven and a half inches from 3. Interposed in the path of the light rays proceeding from object B to lens L, is 2, a double concave spherical lens of approximately −5 diopters, positioned about five inches in front of 3. Double concave lenses 1 and 2, as well as prism 3, are attached to the camera structure by any suitable means such as a holding frame which sustains them in their proper positions thereon.

I have found by interposing a concave spherical lens, in the path of the light rays proceeding from an object to a photographic film, that the image produced on the film is of considerably smaller proportions than a similar image would be produced without the use of the concave lens. I have also found that by increasing the curvature of the concave lens, the size of the image decreases; so by placing a double concave lens of −10 diopters in the path of the light rays from object A, and a −5 diopter double concave lens in the path of the light rays from object 2, the image of object A is proportionately smaller than the image of object B, when both are produced on the photographic film F.

Referring again to Fig. 1, the light rays proceeding from object A, pass through double concave lens 1, and are refracted thereby to reflecting surface c—d of prism 3, after which the said surface reflects them through lens L to film F, where image A' is produced. Simultaneously therewith, the light rays from object B proceed through double concave lens 2, and are refracted thereby, to the surface c—d of prism 3, after which they are refracted by said prism through lens L, onto film F, where image B' is produced. Owing to the fact that lens 1 is of −10 diopters and lens 2 is of −5 diopters, the image A' is proportionately smaller than image B'. Thus by means of the apparatus herein illustrated and described, I am able to produce simultaneously on a single photographic film, two images of two separate objects, one of which is proportionately larger than the other. Although I have illustrated and explained my invention as referring to the photographing of objects, it is to be expressly understood that separate scenes or combinations of objects and scenes may be photographed in the same manner and with the same apparatus as are the separate objects photographed. Therefore the term "object" as herein employed is to be construed generally as referring to scenes and combinations of objects and scenes, as well as to individual objects.

While the embodiments of the invention illustrated on the drawings have been described with considerable particularity, it is to be expressly understood that I am not limited to any particular detail of construction, as changes may be made in the forms of lenses employed, without departing from the spirit of this invention. Although I have shown double concave lenses of but two different degrees of curvature, it is to be understood that other forms or shapes of lenses may be used successfully, and without departing from the spirit of my invention. Nor am I limited to any particular kind or form of photography, or to any particular kind of film or plate upon which the images are to be produced, as it is apparent to those skilled in the art that my invention is equally applicable to both still and motion photography.

What I claim is:

1. The method of producing a plurality of miniature images of a plurality of objects on a photographic film which comprises, interposing a double concave lens in the path of the light rays from one of said objects and refracting said light rays to a light-reflecting prism positioned to reflect an image of said object through a camera lens onto said film, and simultaneously, interposing another double concave lens of less curvature than the first mentioned concave lens, in the path of the light rays from another of said objects, and refracting the said light rays through the said camera lens onto the photographic film.

2. The method of producing a miniature image effect on a photographic film which comprises, refracting the light rays from said object to a light-reflecting prism by means of a concave lens interposed in the path of said light rays, and reflecting a miniature image of said object through a camera lens onto said film by means of said prism.

3. The method of producing variable image effects of a plurality of objects on a sensitized film which comprises refracting by means of a double concave lens, the light rays from one of said objects to a light-reflecting prism, and reflecting by means of said prism, a miniature image of said object through a camera lens onto said film, and simultaneously refracting the light rays from another of said objects through said camera lens onto said film, by means of a second double concave lens of less curvature than the first mentioned double concave lens interposed in the path of said light rays from said object.

4. Means for producing a plurality of images of a plurality of objects upon a sensitized photographic film comprising a camera lens, a light refracting double concave lens positioned to refract the light rays from one of said objects to a light-reflecting prism so positioned as to reflect said rays through said camera lens onto said film, a second light reflecting double concave lens of less curvature than the first mentioned double concave lens, positioned to refract the light rays from another of said objects through said camera lens onto said film.

5. In combination with a camera lens, a plurality of double concave lenses adapted to refract the light rays from a plurality of objects through said lens onto a film.

6. In a device of the class described, the combination of a camera lens, a light-refracting concave lens positioned to refract the light rays from an object to a light-reflecting prism so positioned as to reflect said light rays through said camera lens onto a film, and a second light-refracting concave lens positioned to refract the light rays from a second object through said camera lens onto said film.

7. In a device of the class described, the combination of a camera lens, a light refracting double concave lens positioned to refract the light rays from an object, a light-reflecting prism adapted to reflect the said light rays proceeding from said double concave lens, through the camera lens onto said film; a second double concave lens of less curvature than the first mentioned double concave lens, positioned to refract the light rays from a second object through said camera lens onto said film.

8. In a device of the class described, the combination of a camera lens, a light-reflecting prism positioned adjacent said lens and at a predetermined angle to the axis thereof, a light refracting double concave lens positioned at an angle of 90 degrees with reference to the axis of said camera lens and a second light-refracting double concave lens of less curvature than the first mentioned double concave lens, positioned in front of said prism with its axis coinciding with the axis of said camera lens.

LEON F. DOUGLASS.